United States Patent [19]
Sadler et al.

[11] 3,891,144
[45] June 24, 1975

[54] CLOCK CONTROLLED THERMOSTAT

[76] Inventors: Keith A. Sadler, 1505 Del Gado Dr., Sherman Oaks, Calif. 91403; Ralph E. Phillips, Jr., 9154 Janice Pl., Beverly Hills, Calif. 90210

[22] Filed: Mar. 14, 1974

[21] Appl. No.: 451,006

Related U.S. Application Data

[62] Division of Ser. No. 366,584, June 4, 1973, Pat. No. 3,825,872.

[52] U.S. Cl. ............... 236/46; 236/47; 337/301
[51] Int. Cl. ............................................. G05d 23/32
[58] Field of Search ........ 236/47, 46; 337/301, 302, 337/303

[56] References Cited
UNITED STATES PATENTS

| | | | |
|---|---|---|---|
| 1,316,517 | 9/1919 | Souder et al. | 236/46 |
| 1,720,723 | 7/1929 | Dodge | 236/47 |

*Primary Examiner*—William E. Wayner

[57] ABSTRACT

A clock controlled thermostat in which the clock does not require a separate source of power but is energized from the same source as the remaining circuitry of the thermostat.

4 Claims, 8 Drawing Figures

PATENTED JUN 24 1975 3,891,144

SHEET 1

PATENTED JUN 24 1975
SHEET 3
3,891,144
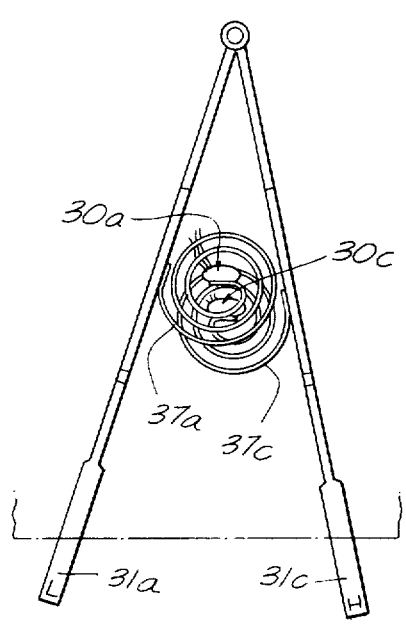
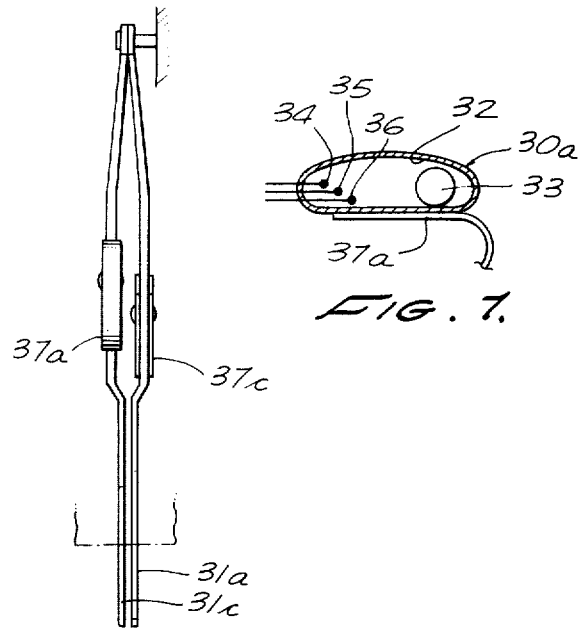
FIG. 5.   FIG. 6.   FIG. 7.
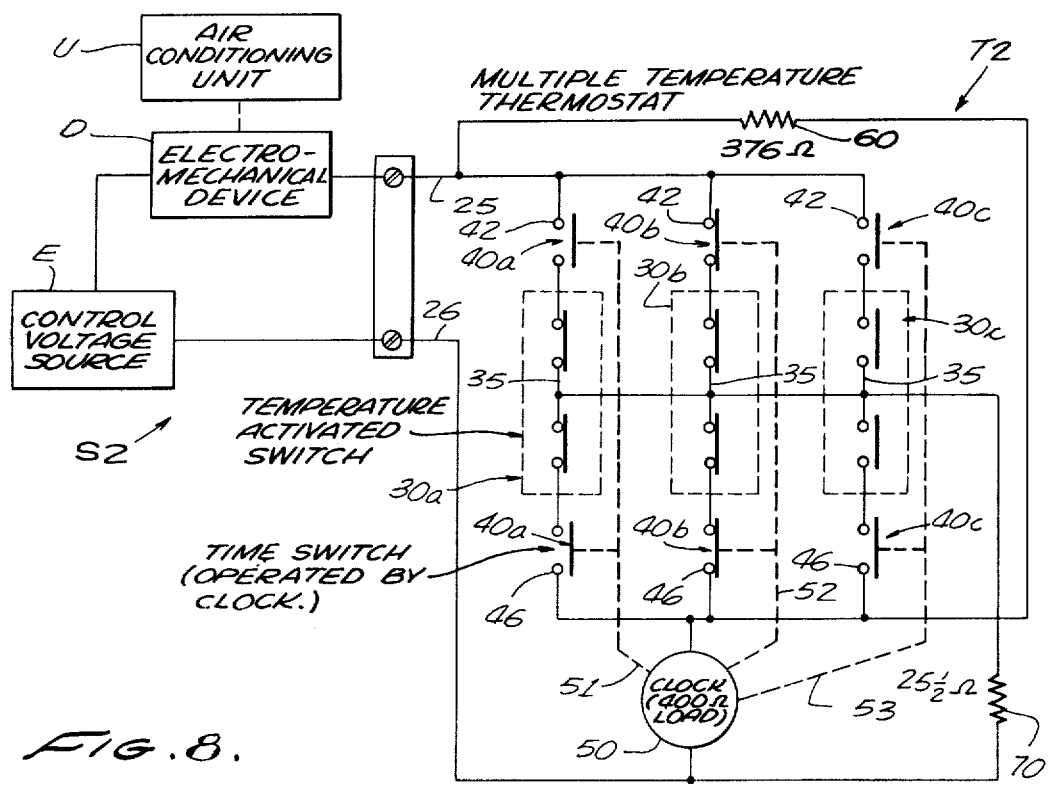
FIG. 8.

CLOCK CONTROLLED THERMOSTAT

This is a division of application Ser. No. 366,584 filed June 4, 1973 now U.S. Pat. No. 3,825,872.

BACKGROUND OF THE INVENTION

The term "air conditioning system" is used in a general sense to refer either to a heating system, or a cooling system, or some combination thereof.

It is well known in air conditioning systems to utilize a thermostat which is manually settable to a selected control temperature level. For example, the occupant of the building space may desire to establish the temperature level at 68° or at 74°, or such other temperature as he may select.

It is also well known to utilize a thermostat which is capable of regulating room temperature at two or more different temperature levels, in a predetermined time sequence. For example, the room temperature may be regulated at 70°in the day time and at 60°during the night. Such a thermostat requires a pair of temperature-activated switches each of which can be manually set to the control temperature level it is to maintain. One is manually set to a desired day time temperature and the other is manually set to a desired night time temperature. Then an associated time clock is utilized in order to switch automatically to one of these controls in the morning, and to the other in the evening.

In the dual temperature thermostats which have been known heretofore it has been necessary to use two separate sources of energy, one for the time clock and another for the remaining circuitry of the thermostat.

SUMMARY OF THE INVENTION

According to the present invention the time clock is energized from the same circuit as the remaining portion of the thermostat.

The essence of the function of the thermostat is to switch another device on and off, and this is done by switching an associated electrical circuit on and off. It would appear, therefore, that when the circuit being controlled is switched off it is no longer a source of energy and could not be used for supplying energy to a time clock associated with the thermostat. However, the present invention provides a solution to this problem.

It is therefore, the object and purpose of the present invention to provide a clock controlled thermostat which does not require a separate circuit for energizing the clock.

DRAWING SUMMARY

FIG. 5 is a front elevation view of the manually settable temperature-activated switches utilized in the thermostat of FIG. 1;

FIG. 6 is a side elevation view of the apparatus of FIG. 5;

FIG. 7 is a fragmentary detail view of the switch mechanism of FIGS. 5 and 6;

FIG. 8 is a schematic diagram of a multiple-temperature control system in accordance with the invention.

FIRST EMBODIMENT

Reference is now made to FIGS. 1 through 7, inclusive, illustrating a first embodiment of the invention.

Figure 4:
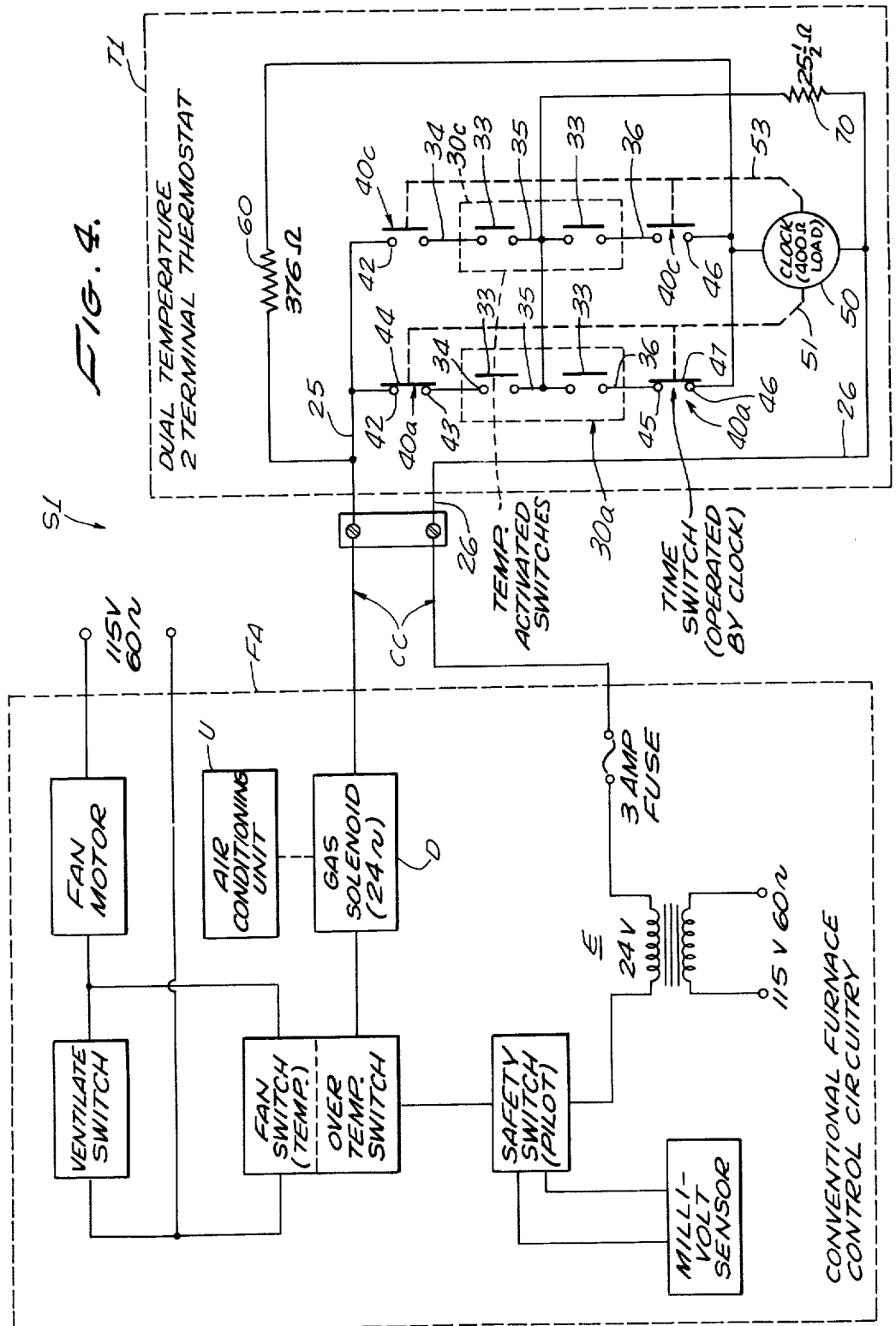
FIG. 4 is a schematic diagram of an air conditioning system which incorporates the thermostat of FIG. 1.

FIG. 4 illustrates schematically the air conditioning system S1 which includes conventional furnace apparatus FA enclosed in a dotted box and a novel thermostat T1 in accordance with the present invention which is enclosed in another dotted box. Furnace apparatus FA includes, amongst other elements, an air conditioning unit U, a gas solenoid D, and a control voltage source E. Unit U must be selectively turned on and off by some type of electro-mechanical device, such as device D, and source E provides operating energy for this purpose. The furnace apparatus FA also includes a fan motor and controls, safety controls, and the like, which are entirely conventional and need not be described in detail here.

A control circuit CC consisting of a single pair of conductors serves to couple thermostat T1 to the furnace apparatus FA. It will be noted that the wires or leads of circuit CC are coupled in a series loop with the voltage source E and electromechanical control device D. Thermostat T1 is a dual temperature two-terminal thermostat. It includes a temperature-activated switch 30a and a temperature-activated switch 30c. These devices may be constructed in any suitable manner so as to close when the ambient temperature passes a control temperature level while moving in one direction, and to open when the ambient temperature passes the same control level when moving in the opposite direction.

In order that the present disclosure be complete there is illustrated in FIGS. 1, 5, 6, and 7 a type of temperature-activated switch which may be utilized for purposes of the present invention. Specifically, temperature-activated switch 30a which is employed to establish the night time or lower temperature, may include a shaft having a handle 31a attached to its lower end, the handle 31a bearing the inscription L to indicate that this handle is manipulated in order to set the lower or night time control. The temperature-activated switch 30c may then have a similar shaft with handle 31c on its lower end designated by the letter H for the higher or day time temperature. Both shafts pivot from a common pivot support at their upper ends, as best seen in FIGS. 5 and 6.

As shown in FIG. 7, each switch includes a chamber 32 within which a ball of mercury 33 is housed. A set of spaced contacts 34, 35, 36 extend in an insulated relationship through and within one end of the chamber. When the chamber is inclined in one direction (as shown in FIG. 7) the ball of mercury rolls away from the contacts; when it is inclined in the other direction the mercury immerses all of the contacts and places them in electrically conductive relationship. Chamber 32 is supported from a coil spring 37 which is in turn attached to the associated shaft of the mechanism. Pivoting of the shaft toward or away from a vertical position causes the coil spring to either wind or unwind changing the aspect of the associated chamber 32.

Each coil spring 37a, 37c is also affected by the ambient temperature. Any change in the ambient temperature causes the coil spring to either wind or unwind a small amount, changing the aspect of the chamber 32.

Changes in the ambient temperature therefore cause the mercury ball 33 to roll back and forth in the chamber, thus closing or opening the switch.

Referring again to FIG. 4 it will be seen that in each of the temperature-activated switches 30a, 30c there are fixed contacts 34, 35, 36 and a movable contact 33. The fixed contacts are arranged so that 34, 35 form one pair and 35, 36 form another pair. Movement of the movable member 33 closes both pairs of fixed contacts.

The circuit of thermostat T1 as shown in FIG. 4 also includes a time switch 40a associated with temperature-activated switch 30a, and a time switch 40c associated with temperature-activated switch 30c. The structure and arrangement of the two time switches are the same so only one will be described in detail.

Time switch 40a has a pair of fixed contacts 42, 43 with which a movable contact member 44 is associated. The contacts 42, 43 are arranged in series with contact 34 of switch 30a. Switch 40a also has a pair of fixed contacts 45, 46 with which a movable contact member 47 is associated. The contacts 45, 46 are arranged in series with contact 36 of switch 30a. Movable contact members 44, 47 are mechanically connected together as indicated by a dotted line in the drawing.

Contact 42 is connected to one lead 25 of the control circuit CC. The energizing inputs of the clock 50 are connected between contact 46 and the other lead 26 of control circuit CC.

Thus when the temperature-activated switch 30a is closed and the associated time switch 40a is also closed the clock 50 receives operating energy through both of these switches from the source E.

Also included within the thermostat T1 is a resistor 60 having a relatively high value such as 376 ohms, which is connected between contacts 42 and 46. If either one of the switches 30a, 40a is opened, then clock 50 receives energizing current through resistor 60.

Also included in the circuit of thermostat T1 is a resistor 70 having a relatively low resistance value such as 25 ½ ohms. Resistor 70 is connected between terminal 26 of control circuit CC and contact 35 of switch 30a. If both switches 30a and 40a are closed, then not only does clock 50 receive current from source E as previously described, but some of the current from source E is bypassed around the clock and flows instead through the resistor 70.

It will be noted that resistor 70 is connected to contact 35 of each one of the switches 30a, 30c, and hence during either day time or night time when the relevant temperature-activated switch is closed there will then be some of the current from voltage source E which is being shunted through resistor 70 and hence around the clock 50. Resistor 60 is connected between contacts 42 and 46 of switch 40c, as well as switch 40a.

Figure 1:
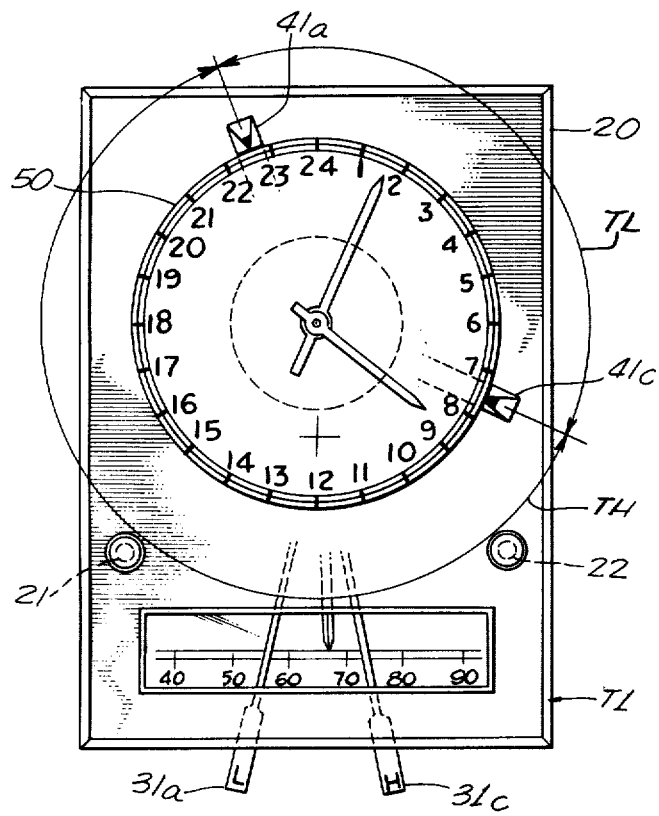
FIG. 1 is a front elevation view of a typical thermostat in accordance with the present invention.

Thermostat T1 as shown in FIG. 1 also includes movable indicators 41a, 41c which are moved around the clock 50 in order to establish the times when switching will occur between one control level and the other. The positioning of indicator 41a establishes the time when coupling 51 (shown in dotted line in FIG. 4) will be effective to close the time switch 40a; and in similar fashion the position of indicator 41c determines when the coupling 53 (shown in dotted lines in FIG. 4) will be effective to close the time switch 40c. This time clock mechanism is not novel and is illustrated and described solely for the purpose of explaining a suitable manner in which the present invention may be mechanized.

Figure 2:
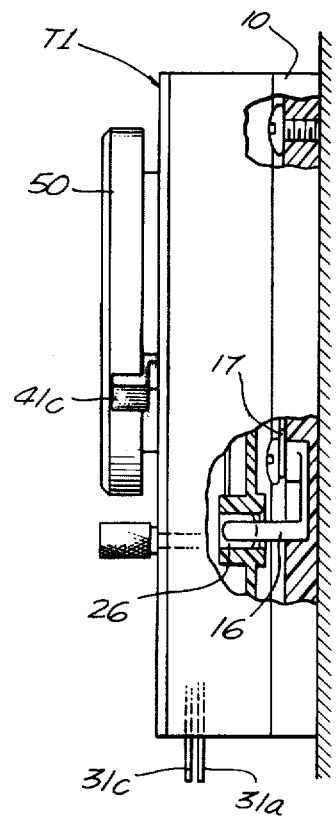
FIG. 2 is a side elevation view, partially cut away, of the thermostat of FIG. 1.
Figure 3:
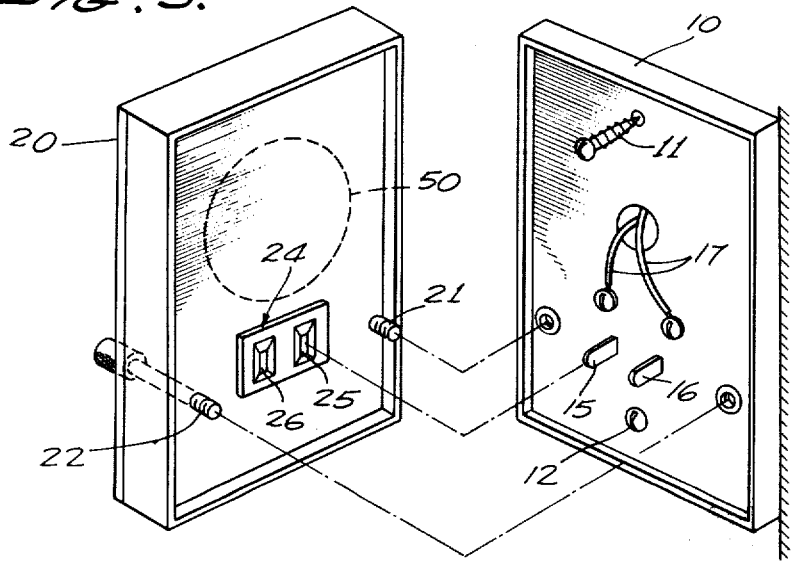
FIG. 3 is a perspective view of the housing and back plate of the thermostat of FIG. 1 when disassembled from each other.

Reference is now made to FIGS. 2 and 3 of the drawings which illustrate the mechanical details of the thermostat T1. Back plate 10 has a rectangular configuration and is adapted to be fastened to the wall of the structure by means of screws 11, 12. Male plug elements 15, 16 protrude from the back plate. An opening is provided in the central portion of the back plate so that cable pair 17 constituting the control circuit CC may be brought through to the face of the back plate and attached to respective terminals for energizing the male plug 15, 16.

Housing 20 is made of the same rectangular configuration as back plate 10 and is adapted for removable attachment to the back plate. An insulating plate 24 on the back of housing 20 has female connector elements 25, 26 adapted to receive the male connectors 15, 16, respectively. Threaded bolts 21, 22 pass through the sides of the housing, from front to rear, for engaging corresponding threaded openings in the back plate 10 so as to support the housing from the back plate. Each of the threaded bolts has a knurled thumb nut on its outer end for convenience in removing or attaching the housing.

The housing 20 contains all of the electrical circuitry of thermostat T1 as shown in FIG. 4, and also has the time clock 50 mounted on its front wall as shown in FIGS. 1 and 2.

A typical operation of the invention will now be described. Assuming that the hour is 24 or midnight, the hour hand of the clock will then point to 24 and the thermostat will then be working in the TL or lower temperature range. Time switch 40a will have previously been closed and will continue to be closed so as to keep the temperature-activated switch 30a in circuit with the gas solenoid D. The handle 31a has previously been set for a night time temperature such as 56°, according to FIG. 1. When the room temperature drops below 56° the mercury switch will close, causing contact pairs 34, 35 and 35 36 to become conductive and gas solenoid D will then turn on the air conditioning unit U (i.e. in this instance, a furnace which will provide additional heat so as to raise the room temperature). When the temperature rises above the control level the mercury switch will open and the furnace will be turned off. During all of this operation the time switch 40c has been open.

But when the time reaches 7:30 A.M. the clock will then operate through coupling mechanism 53 associated with the indicator 41c so as to close the switch 40c and open the switch 40a. The thermostat will now work in the TH of high temperature range. Temperature activated switch 30c has been set for about 73°, and since room temperature is far below this level the mercury switch will have already been closed and will immediately cause the furnace to turn on. When room temperature rises to the control level the mercury switch will open, and the furnace will turn off.

Throughout the various openings and closings of the various switches the clock 50 remains energized, and with a relatively constant current level. When the particular mercury switch then performing the control function is closed, the clock 50 constituting about 400 ohm load is in parallel with resistor 70 having a value of 25 ½ ohms and these two devices constitute the load on the voltage source E. When the mercury switch is open the clock is in series with resistor 60 which insures that the clock still receives adequate operating current from the source E.

SECOND EMBODIMENT

Reference is now made to FIG. 8 illustrating a second embodiment of the present invention. The complete air conditioning system is designated as S2. Thermostat T2 incorporates three temperature control levels. A low level is established by switch 30a, a medium level by switch 30b, and a high level by switch 30c. A time switch 40b is associated with temperature-activated switch 30b, and is controlled from the clock by means of a coupling 52 (shown in dotted lines). Resistor 70 is connected to the fixed contact 35 in each of switches 30a, 30b, 30c. All of the contacts 42 are connected to lead 25, and all of the contacts 46 are connected to lead 26.

As will be understood by those skilled in the art, what has been described are preferred embodiments in which modifications and changes may be made without departing from the spirit and scope of the accompanying claims.

We claim:

1. An air conditioning system comprising:
   an air conditioning unit;
   a control voltage source;
   an electromechanical device coupled to said air conditioning unit for selectively turning the same on or off, and having a pair of electrical connections; and
   a temperature control device having a pair of electrical terminals coupled in a series loop with said voltage source and with said electrical connections of said electromechanical device;
   said temperature control device including
   a. multiple temperature-activated switches each of which is operable in response to a predetermined temperature level for turning said air conditioning unit on or off,
   b. multiple time switch means operable for coupling a selected one of said temperature-activated switches across said terminals,
   c. timing means coupled to said time switch means for selectively operating the same,
   d. first resistor means coupled in a series loop with said timing means and said terminals when the selected temperature-activated switch is open, and
   e. second resistor means coupled in parallel with said timing means between said terminals when the selected temperature-activated switch is closed.

2. Apparatus as claimed in claim 1 wherein said switches, switch means, and resistor means cooperatively maintain substantially constant current from said control voltage source through said timing means.

3. Apparatus as in claim 1 wherein said first resistor means has a relatively high value and said second resistor means has a relatively low value.

4. Apparatus as in claim 2 wherein said first resistor means has a relatively high value and said second resistor means has a relatively low value.

* * * * *